(12) United States Patent
Barsheshet et al.

(10) Patent No.: US 9,840,336 B2
(45) Date of Patent: Dec. 12, 2017

(54) TIP WITH NOZZLE LOAD SENSING AND WIRELESS COMMUNICATION FUNCTIONALITY FOR REFUELING BOOM

(71) Applicant: ISRAEL AEROSPACE INDUSTRIES LTD., Lod (IL)

(72) Inventors: Moshe Barsheshet, Petach Tikva (IL); Yoav Herzig, Ein Sarid (IL); Elie Koskas, Rosh Haayin (IL); Michael Litvak, Tel Aviv (IL); Daniel Frydman, Raanana (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 250 days.

(21) Appl. No.: 14/163,515

(22) Filed: Jan. 24, 2014

(65) Prior Publication Data

US 2014/0203147 A1 Jul. 24, 2014

(30) Foreign Application Priority Data

Jan. 24, 2013 (IL) .......................................... 224386

(51) Int. Cl.
*B64D 39/04* (2006.01)

(52) U.S. Cl.
CPC .................................... *B64D 39/04* (2013.01)

(58) Field of Classification Search
CPC ..................................................... B64D 39/04
See application file for complete search history.

(56) References Cited

U.S. PATENT DOCUMENTS

| | | | | |
|---|---|---|---|---|
| 2,941,761 A * | 6/1960 | Cox | ........................ | B64D 39/00 244/135 A |
| 3,475,001 A * | 10/1969 | Hieber | ................... | B64D 39/06 137/614.03 |
| 3,794,270 A * | 2/1974 | Wilkens | .................... | B64G 1/32 244/172.4 |
| 4,381,092 A * | 4/1983 | Barker | ................... | B64G 1/646 114/250 |
| 4,780,838 A | 10/1988 | Adelson | | |
| 5,131,438 A * | 7/1992 | Loucks | ................. | B64C 39/024 141/1 |
| 5,326,052 A * | 7/1994 | Krispin | ................. | B64D 39/06 244/135 A |
| 5,906,336 A * | 5/1999 | Eckstein | ................ | B64D 39/00 244/135 A |

(Continued)

FOREIGN PATENT DOCUMENTS

| | | |
|---|---|---|
| EP | 1894840 A1 | 3/2008 |
| WO | 2009/123774 A1 | 10/2009 |

(Continued)

OTHER PUBLICATIONS http://aviationexplorer.com/kc-10-fact.html, "USAF KC-10 Extender Cargo/Aerial Refueling Aircraft Pictures History and Facts", pp. 1-6, Jan. 2017.

(Continued)

*Primary Examiner* — Justin M Benedik
(74) *Attorney, Agent, or Firm* — Browdy and Neimark, PLLC

(57) ABSTRACT

A Wireless Communication and Sensor System (WSCC) serving a refueled entity and a refueling entity, the system comprising nozzle load sensing functionality for a nozzle Boom Tip Unit; and apparatus for wirelessly transmitting loads sensed by the nozzle load sensing functionality to at least one of a boom operator and a boom flight control computer.

33 Claims, 7 Drawing Sheets

(56) References Cited

U.S. PATENT DOCUMENTS

| | | | |
|---|---|---|---|
| 6,604,711 B1* | 8/2003 | Stevens | B64C 39/024 244/135 A |
| 6,669,145 B1* | 12/2003 | Green | B64D 39/00 244/135 A |
| 6,837,462 B2 | 1/2005 | Von Thal | |
| 6,869,042 B2* | 3/2005 | Harrison | B64C 39/024 244/110 R |
| 6,889,941 B1* | 5/2005 | McElreath | B64D 39/00 244/135 A |
| 6,926,049 B1* | 8/2005 | Enig | B64D 39/04 137/615 |
| 6,966,525 B1* | 11/2005 | Schroeder | B64D 39/00 244/135 A |
| 6,988,693 B2* | 1/2006 | Shelly | B63B 27/24 244/135 A |
| 7,007,894 B1* | 3/2006 | Takacs | B64D 39/00 114/213 |
| 7,036,770 B2* | 5/2006 | Shelly | B64D 39/04 244/135 A |
| 7,137,598 B2* | 11/2006 | Von Thal | B64D 39/00 244/135 A |
| 7,185,854 B2* | 3/2007 | Von Thal | B64D 39/02 244/135 A |
| 8,022,843 B2 | 9/2011 | Mitchelle et al. | |
| 2003/0205643 A1* | 11/2003 | von Thal | B64D 39/00 244/135 A |
| 2005/0045768 A1* | 3/2005 | Saggio | B64D 39/04 244/135 A |
| 2006/0060709 A1 | 3/2006 | Thal | |
| 2006/0145023 A1* | 7/2006 | Babb | B64G 1/64 244/172.4 |
| 2007/0023575 A1 | 2/2007 | Von Thal | |
| 2008/0265097 A1 | 10/2008 | Stecko | |
| 2009/0095843 A1 | 4/2009 | Powell | |
| 2010/0001124 A1* | 1/2010 | Feldmann | B64D 39/06 244/58 |
| 2010/0327116 A1* | 12/2010 | De Miguel | B64D 39/04 244/135 A |
| 2013/0068889 A1* | 3/2013 | Richardson | B64D 39/04 244/135 A |

FOREIGN PATENT DOCUMENTS

| | | | |
|---|---|---|---|
| WO | 2010/118131 A1 | 6/2010 | |
| WO | 2010/071643 A2 | 10/2010 | |

OTHER PUBLICATIONS http://www.airforce-technology.com/features/featurethe-worlds-best-aerial-refuelling-aircraft/, "The World's Aerial Refuelling Aircraft", Nov. 11, 2013, pp. 1-5.

Mortensen, Adam L., Thesis: "Improved Load Alleviation Capability for the KC-135", Air Force Inst of Tech Wright-Patterson AFB OH School of Engineering, Sep. 1997.

Israeli Air Force Grounds Fighter Aircraft After Near-Collision, Israeli Air Force Grounds Fighter Aircraft After Near-Collision, Oct. 15, 2012, pp. 1-4.

http://www.iaf.org.il/4401-41270-en/IAF.aspx, "The Israeli Air Force: Go Long: Practicing Aerial Refueling on the Hercul", pp. 1-4, Mar. 21, 2013.

Simulating aerial Refueling of Israeli Air force Aircraft, 2015 i-HLS.

http:/formerspook.blogspct.co.il/2012103/has-israel-found-fob. hlml/, "In From the Cold: Has Israel Found a FOB?", pp. 1-3, Mar. 31, 2012.

Egozi, Arie, "Boom simulator to sharpen Israeli tanker training,The Israeli air force is evaluating the purchase of an aerial refuelling simulator to answer its growing demand for this capability", Light International, Mar. 2, 2015, pp. 1-3.

Bendavid, Alon, "Israel Bolsters KC-707 Refueling Fleet", Israel Bolsters KC-707 Refueling Fleet, Jan. 14, 2010, pp. 1-3.

Cohen, Gili, "Israel Air Force Grounds Fighter Jets After Series of Near-accidents", http://webcache.googleusercontent.com/search?q=cache:QuRkTWOxxTQJ:www.haaretz.com/israel-neII-IIs!israel-air-force-grounds-fighter-jets-after-series-of . . . Oct. 15, 2012, pp. 1-6.

"Thesis: Analysis of the Causes of Inflight Refueling Mishaps with the KC-135", Department of the Air Force Air University Air Force Institute of Technology, Sep. 1989, pp. 1-59.

http://www.crunchwear.com/human-universal-load-carrier-or-hulc-is-a-wearable-exoskeleton-for-soldiers/—Jul. 5, 2011.

http://www.crunchwear.com/lockheed-martins-hulc-robotic-exoskleton-begins-a-series-of-laboratory-tests/—Oct. 27, 2010.

http://www.sooperarticles.com/business-articles/industrial-mechanical-articles/wireless-industrial-remote-control-aircraft-refueling-system-757409.html—Dec. 23, 2011.

Mantra—Parts List Report (BOM), Dec. 5, 2012.

Signal and Signal/Intercommunication Amplifiers, Universal, Aerial Refueling, Jun. 10, 2011.

http://www.cellular-news.com/tags/lockheed-martin/—Nov. 28, 2011.

Lockheed Martin AMF JTRS Team Delivers Joint Tactical Radio to Air Force Research Lab for C-130J and C-5 Integration Risk Reduction—Worldnews_com (4).htm—Aug. 24, 2011.

http://www.networkworld.com/article/2279694/network-security/inside-lockheed-martin-s-wireless-security-lab.html—May 20, 2008.

http://www.cellular-news.com/story/30789.php—Apr. 24, 2008.

https://en.wikipedia.org/w/index.php?title=Aerial_refueling &oldid=587954668—Dec. 23, 2013.

Gandy, M., & Martin, L. (2000). Wireless Sensors for Aging Aircraft Health Monitoring. URL: http://www. jcaa. us/AA_Conference_2001/Papers/7B_2. pdf. Lockheed Martin Structural Health Monitoring.

* cited by examiner

FIG. 6

300: provide legacy nozzle e.g. Military Standard MS27604 Nozzle which may not have nozzle load sensing and/or sensed nozzle load communication capabilities

↓

310: provide Wireless Communication and Sensor System (WSCC) serving a refueled entity (receiver) and a refueling entity (tanker) e.g. aircraft, the system comprising nozzle load sensing functionality for a nozzle Boom Tip Unit serving the legacy nozzle; and apparatus for wirelessly transmitting loads sensed by nozzle load sensing functionality to boom operator/boom flight control computer

↓

320: install WSCC in form of plug retrofit between legacy Boom Telescope and nozzle

↓

230: refuel, including sensing loads using Load Sensor Units e.g. shear sensitive unit employing strain gauges to generate coil signal representative of nozzle's shear strain

↓

340: wirelessly (e.g. using ZigBee or BlueTooth wireless technology), transmit information from the Boom tip unit to a boom operator/boom flight control system e.g. via Boom Forward Unit 80, the information typically including some or all of: sensed boom tip loads, voice communication between receiver and tanker, boom contact status (e.g. "contact made" signal: whether or not contact has been made) and disconnect command; optionally, some or all of the above information travels through a single wireless channel

TIP WITH NOZZLE LOAD SENSING AND WIRELESS COMMUNICATION FUNCTIONALITY FOR REFUELING BOOM

REFERENCE TO CO-PENDING APPLICATIONS

Priority is claimed from Israel Patent Application No. 224386 "Tip with nozzle load sensing and wireless communication functionality for refueling boom" filed on Jan. 24, 2013, the entire contents of which being hereby incorporated herein by reference.

FIELD OF THIS DISCLOSURE

The present invention relates generally to air refueling by aircraft equipped with a standard air refueling nozzle.

BACKGROUND FOR THIS DISCLOSURE

According to Wikipedia, aerial refueling systems include probe-and-drogue and a flying boom, which typically requires a dedicated operator station.

The flying boom typically comprises a rigid, telescoping tube with movable flight control surfaces that an operator on the tanker aircraft extends and inserts into a receptacle on the receiving aircraft. The flying boom is typically attached to the rear of a tanker (refueling) aircraft. The attachment is typically gimballed, allowing the boom to move with the receiver (refueled) aircraft. The boom contains a rigid pipe to transfer fuel. The fuel pipe ends in a nozzle with a flexible ball joint. The nozzle mates to a "receptacle" in the receiver aircraft during fuel transfer. Typically, a poppet valve in the end of the nozzle prevents fuel from exiting the tube until the nozzle properly mates with the receiver's refueling receptacle. Once properly mated, toggles in the receptacle may engage the nozzle, holding it locked during fuel transfer.

In a "flying" boom, flight control surfaces, typically comprising small movable airfoils, may be used to move the boom by creating aerodynamic forces. The airfoils may be actuated hydraulically and controlled by the system operator using a control stick. The operator also typically telescopes the boom to make the connection with the receiver's receptacle.

According to Wikipedia, "to complete an aerial refueling, the tanker and receiver aircraft rendezvous, flying in formation. The receiver moves to a position behind the tanker, within safe limits of travel for the boom, aided by director lights or directions radioed by the boom operator. Once in position, the operator extends the boom to make contact with the receiver aircraft. Once in contact, fuel is pumped through the boom into the receiver aircraft . . . . While in contact, the receiver pilot must continue to fly within the "air refueling envelope," the area in which contact with the boom is safe . . . . When the desired amount of fuel has been transferred, the two aircraft disconnect, and the receiver aircraft departs the formation. While not in use, the boom is stowed flush with the bottom of the tanker's fuselage to minimize drag."

Conventional technology pertaining to certain embodiments of the present invention is described in the following publications inter alia:

A wireless aircraft sensors network is described in U.S. Pat. No. 8,022,843.

Wireless sensors used for airborne applications are described in "Wireless sensors for aging aircraft stealth monitoring", by Michael Gandy, Lockheed Martin Corporation, year 2000, available on the World Wide Web.

A smart boom tip assembly is described in published US Patent Application US2010327116A (assigned to Airbus).

The disclosures of all publications and patent documents mentioned in the specification, and of the publications and patent documents cited therein directly or indirectly, are hereby incorporated by reference.

SUMMARY OF CERTAIN EMBODIMENTS

The term "boom" is used herein to include any arm, typically extendable, that connects two aircraft e.g. for fuel transfer.

Certain embodiments of the present invention seek to provide a Tip For a Refueling Boom Having Nozzle Load Sensing And Wireless Communication Functionality, also termed herein a WCSS (Wireless Communication and Sensor system), typically comprising a boom tip unit and a Boom Forward Unit, for air refueling booms such as but not limited to conventional air refueling systems e.g. those flying in Boeing's KC-135 and Israel Aircraft Industries' B707 air refueling tanker.

An advantage of certain embodiments of the present invention relative to existing systems such as that described in US Patent Application US2010327116A (assigned to Airbus) is the wireless transmission of data which may eliminate need for installation of wiring between a telescoping section and a boom portion of a refueling system. During refueling, the telescope moves considerably relative to the boom, requiring a complex and/or relatively large and cumbersome (e.g. coiled) wiring installation able to compensate for such considerable motion. Therefore, a wireless system may greatly simplify a booms' mechanical design including saving space. Also, a wireless system may facilitate retrofit installation of a WCSS on legacy boom systems where otherwise wiring installation may not have been feasible e.g. because insufficient space is available for a coiled wire solution which can coil and uncoil responsive to a telescoping motion. Also, a wireless solution, e.g. due to this low signal intensity, may be safer in a fueling environment, relative to a wired solution.

Certain embodiments of the present invention seek to provide a Wireless Communication and Sensor system, which is operative to sense, sample, process and/or wirelessly transmit data from a refueling Boom Tip Unit (Aft Unit), located next to the Air Refueling Nozzle, to a Boom Forward Unit, typically located on the boom external tube side. The Forward Unit may alternatively be disposed on the tanker, or on any portion of the boom unaffected by telescopic motion during refuelling.

Certain embodiments of the present invention seek to provide a Wireless Communication and Sensor system which may be retrofit on a conventional refueling system e.g. as described above.

There is thus provided, in accordance with at least one aspect of the presently disclosed subject matter, a Wireless Communication and Sensor System (WSCC) serving a refueled entity and a refueling entity, the system comprising:
   nozzle load sensing functionality for a nozzle Boom Tip Unit; and
   apparatus for wirelessly transmitting loads sensed by the nozzle load sensing functionality to at least one of a boom operator and a boom flight control computer.

There is thus further provided, in accordance with at least one embodiment of the presently disclosed subject matter, a system wherein the system includes:
   a Boom Tip Unit (Aft Unit); and
   a Boom Forward Unit disposed about the Boom Tip Unit, and wherein the loads are transmitted wirelessly from the Boom tip unit to at least one of a boom operator and a boom flight control computer via the Boom Forward Unit.

There is thus yet further provided, in accordance with at least one embodiment of the presently disclosed subject matter, a system which provides wireless voice communication between the refueled entity and the refueling entity (tanker).

There is thus yet further provided, in accordance with at least one embodiment of the presently disclosed subject matter, a system wherein the voice communication between the refueled entity and the refueling entity passes through the Boom tip.

There is thus yet further provided, in accordance with at least one embodiment of the presently disclosed subject matter, a system wherein data received from Load Sensor Units located on a telescope side is transmitted to a point located on the boom side.

There is thus yet further provided, in accordance with at least one embodiment of the presently disclosed subject matter, a system 1 wherein the refueled entity and refueling entity comprise aircraft.

There is thus yet further provided, in accordance with at least one embodiment of the presently disclosed subject matter, a system wherein any 2 or 3 or 4 of the following:

Boom tip loads, voice, "contact made" signal, and "disconnect" command, all travel through a single wireless channel.

There is thus yet further provided, in accordance with at least one aspect of the presently disclosed subject matter, a method for providing a legacy Air Refueling Boom with a nozzle load sensing capability, the method comprising:

providing a nozzle Boom Tip Unit, serving a legacy nozzle which does not have nozzle load sensing and sensed nozzle load communication capabilities, with nozzle load sensing functionality; and providing apparatus for wirelessly transmitting loads sensed by the nozzle Boom Tip Unit to an Boom Forward Unit and then to at least one of a boom operator and a boom flight control computer.

There is thus yet further provided, in accordance with at least one embodiment of the presently disclosed subject matter, a method wherein the nozzle comprises a Military Standard MS27604 Nozzle.

There is thus yet further provided, in accordance with at least one embodiment of the presently disclosed subject matter, a method comprising using the nozzle Boom Tip Unit for wireless transmission of sensed nozzle loads.

There is thus yet further provided, in accordance with at least one embodiment of the presently disclosed subject matter, a method comprising using the nozzle Boom Tip Unit for wireless voice communication establishment between a receiver and a tanker.

There is thus yet further provided, in accordance with at least one embodiment of the presently disclosed subject matter, a method comprising using the nozzle Boom Tip Unit for wirelessly transmitting at least one of a "contact made" signal created at the Nozzle and a "disconnect" command signal directed to the Nozzle.

There is thus yet further provided, in accordance with at least one embodiment of the presently disclosed subject matter, a method wherein the Boom Tip Unit comprises a plug to be installed between a legacy Boom Telescope and the nozzle, thus enabling retroactive installation of the Boom Tip Unit in a legacy air refueling boom equipped with the nozzle.

There is thus yet further provided, in accordance with at least one embodiment of the presently disclosed subject matter, a system which comprises at least one load sensing element operative for Nozzle Load Sensing and for communication of a sensed load to a legacy Air Refueling Boom system.

There is thus yet further provided, in accordance with at least one embodiment of the presently disclosed subject matter, a method wherein the nozzle comprises a MS27604 nozzle.

There is thus yet further provided, in accordance with at least one embodiment of the presently disclosed subject matter, a system wherein the nozzle Boom Tip Unit comprises a mechanical loads sensitive unit which is operative to generate a signal representative of loads exerted on the nozzle, and to transmit the loads signals and the coil signal including voice communication between the refueled entity and the refueling entity and a "contact made" signal created at the Nozzle and "disconnect" command signal directed to Nozzle.

There is thus yet further provided, in accordance with at least one embodiment of the presently disclosed subject matter, a system wherein the signals are transmitted wirelessly using BlueTooth wireless technology.

There is thus yet further provided, in accordance with at least one embodiment of the presently disclosed subject matter, a system wherein the signals are transmitted wirelessly using ZigBee wireless technology.

There is thus yet further provided, in accordance with at least one embodiment of the presently disclosed subject matter, a system wherein the signals are transmitted wirelessly using Free Space Optical wireless technology.

There is thus yet further provided, in accordance with at least one embodiment of the presently disclosed subject matter, a system wherein the Boom Forward Unit is disposed at a location unaffected by telescopic motion during refueling.

There is thus yet further provided, in accordance with at least one embodiment of the presently disclosed subject matter, a system wherein a range of telescopic boom motion occurs during refueling and wherein transmission power is configured to a minimum required given the range of telescopic motion, so as to reduce the aircraft electromagnetic signature and provide for operation in radio silence.

There is thus yet further provided, in accordance with at least one embodiment of the presently disclosed subject matter, a system wherein the transmission frequency is dynamically changed.

There is thus yet further provided, in accordance with at least one embodiment of the presently disclosed subject matter, a system wherein strain gauges are employed to measure at least one of shear (and/or bending) and torque stresses exerted on the nozzle.

There is thus yet further provided, in accordance with at least one embodiment of the presently disclosed subject matter, a system wherein boom contact and lock detection and audio transmission are based on signal processing performed digitally by the Aft Unit, generating processed digital data for direct transmission to tanker systems of the refueled and refueling entities, thereby obviating analog Boom Signal Amplifiers conventionally installed in boom systems.

There is thus yet further provided, in accordance with at least one embodiment of the presently disclosed subject matter, a system having a plurality of redundant channels each having independent load sensing elements.

The embodiments referred to above, and other embodiments, are described in detail in the next section.

Any trademark occurring in the text or drawings is the property of its owner and occurs herein merely to explain or illustrate one example of how an embodiment of the invention may be implemented.

The present invention may be described, merely for clarity, in terms of terminology specific to particular system versions, individual products, and the like. It will be appreciated that this terminology is intended to convey general principles of operation clearly and briefly, by way of example, and is not intended to limit the scope of the invention to any particular programming language, operating system, browser, system version, or individual product.

Elements separately listed herein need not be distinct components and alternatively may be the same structure.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor may be employed to compute or generate information as described herein e.g. by providing one or more modules in the processor to perform functionalities described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

BRIEF DESCRIPTION OF THE DRAWINGS

Certain embodiments of the present invention are illustrated in the following drawings:

FIG. 6 is a simplified flowchart illustration of a wireless communication-based method for refueling, in accordance with certain embodiments of the present invention.

DETAILED DESCRIPTION OF CERTAIN EMBODIMENTS

Figure 1:
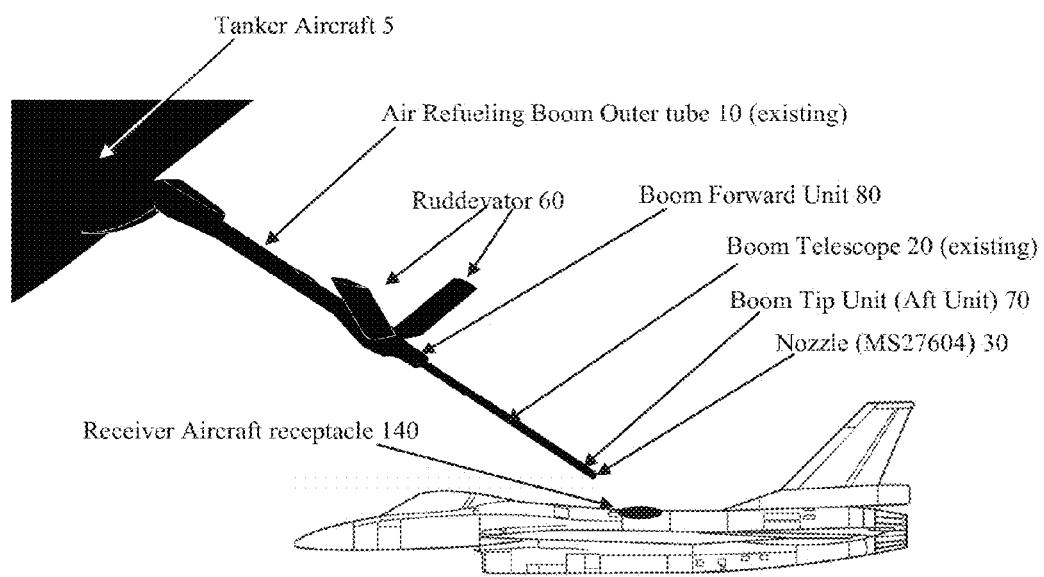
FIG. 1 is a simplified pictorial illustration of a Boom Tip Wireless Communication and Sensor system for a Refueling Boom, in accordance with certain embodiments of the present invention.

A refueling boom e.g. as shown in FIG. 1, typically comprises a rigid, long hollow tube 10 with a telescopic refueling pipe ("telescope") 20. At the edge of the pipe 20 is a nozzle 30, which is operative to connect to a receiver aircraft's refueling receptacle 140, and through which fuel flows, typically responsive to an indication that connection has been made between the nozzle 30 and the aircraft's refueling receptacle 140. The nozzle also typically allows for audio communication via a suitable link between the two aircrafts.

The refueling boom is aerodynamically maneuvered by the ruddervator 60 controlled by the boom operator. The boom operator is responsible for maneuvering the boom in order to engage the nozzle 30 to the Receiver Aircraft receptacle 140.

When the nozzle 30 is engaged to the receptacle 140, the receiver's (receptacle's) coil 100 (FIG. 2) is typically aligned to the boom nozzle coil 110, allowing coil signals 130 thereby induced, and/or audio signals 120, to pass from the receiver aircraft through the boom to the tanker aircraft and back.

While the fuel is flowing, the two aircraft (tanker 5 and receiver) are physically connected by the boom, and the relative motion of the two aircraft induces forces and stress to the boom. In legacy systems, the boom operator is entrusted with suitably controlling the boom to minimize the above forces. If the boom operator fails to control the boom in a way that adequately minimizes the above forces, the structural integrity of the boom, and/or the safety of the receiver may be compromised. These forces may be measured, e.g. to alert to such failure or impending failure, or to minimize these loads by use of closed-loop boom control, by a load sensing element 90 shown in cross-section and isometrically in FIGS. 3 and 4 respectively. Load sensing element 90 typically uses strain gauges 240 to measure shear and torque stresses exerted on the load sensing element, allowing for estimate of the forces exerted on the tip of the nozzle 30. Alternative load sensing technologies may be used, such as piezoresistors, fiber optic gauges, capacitive gauges or any other technology suitable for force measurement. Alternatively, or additionally, bending, tension, and/or compression loads may be measured. These measures are sent to the boom's operator (for mechanically controlled boom) and/or to the boom flight control system (for Fly By Wire boom).

Due to the structure of the boom of FIG. 1 or for other reasons, it may not be possible to deploy a physical communication wireline between the measuring point to a point near the aircraft. To transmit data, a wireless communication system may be employed to send the data between the points. Any suitable wireless technology in radio frequency range, may be employed. The technology may use the frequency range of 2.4~2.5 GHz, which is an ISM frequency. Alternatively, any suitable wireless technology in optical range, such as but not limited to IrDA, or other FSO (Free-space optical communication) technology may be employed.

Figure 3:
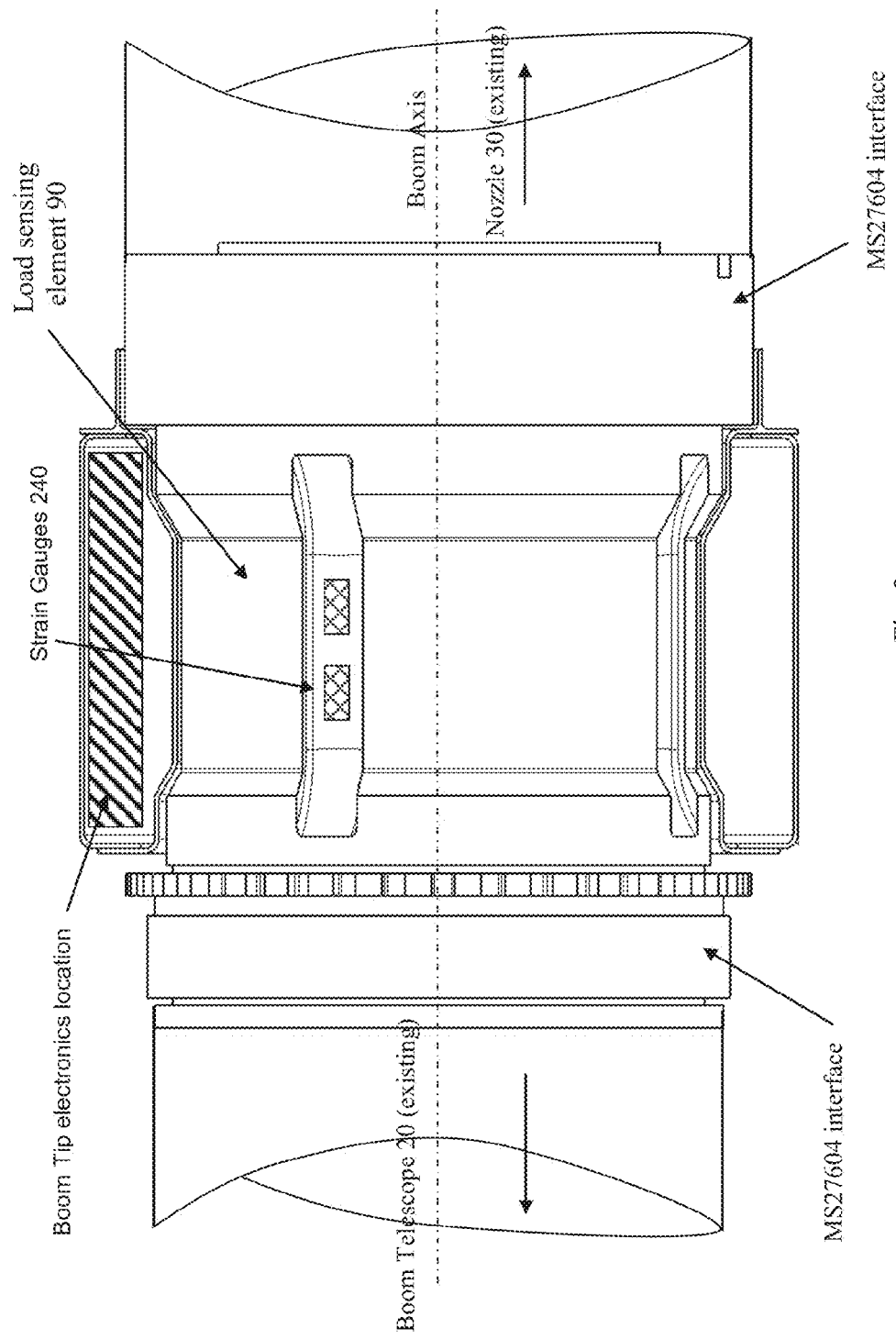
FIG. 3 is a cut-away diagram of the Boom Tip Unit of FIG. 1, in accordance with certain embodiments of the present invention.
Figure 4:
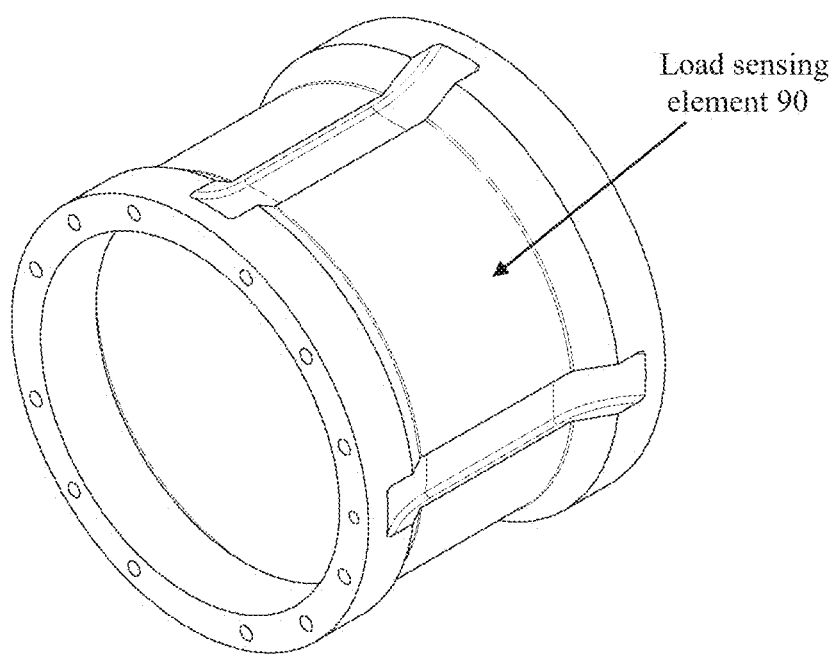
FIG. 4 is a simplified isometric view of the load sensing unit (also termed herein LSU, load sensing element) of FIG. 3, in accordance with certain embodiments of the present invention.

In case of radio wireless, transmission power is typically configured to a minimum required given the range of telescopic motion, so as to reduce the aircraft electromagnetic signature and provide for operation in radio silence. The transmission frequency may be dynamically changed and/or the data may be encrypted, due to security concerns, typically using conventional features in standard wireless protocols, such as but not limited to Bluetooth or ZigBee). The Boom Tip Unit 70, e.g. as in FIG. 3, is typically designed as a plug to be installed between the existing Boom Telescope 20 and the MS27604 nozzle 30, thus enabling easy retroactive installation of the Boom Tip Unit 70 in an existing air refueling boom equipped with an MS27604 nozzle.

As aforesaid, the Boom Tip Unit 70 typically uses strain gauges 240 to measure shear and torque stresses exerted on the nozzle 30. According to an embodiment of the invention, the signals from the strain gauges 240 are amplified and digitized by a Signal Amplifier 220 and transferred to a Controller/Transceiver 210 that wirelessly transmits the signals to a Transceiver 230 located in the Boom Forward Unit 80, and from there to the boom's operator (for a mechanically controlled boom) and/or to the boom flight control system (for Fly By Wire boom). The A/D and D/A units 260, 220 of FIG. 2 typically execute the conversion from analog to digital and vice versa.

The system is typically employed to withstand harsh environmental conditions and/or electro-magnetic and other interferences.

Figure 2:
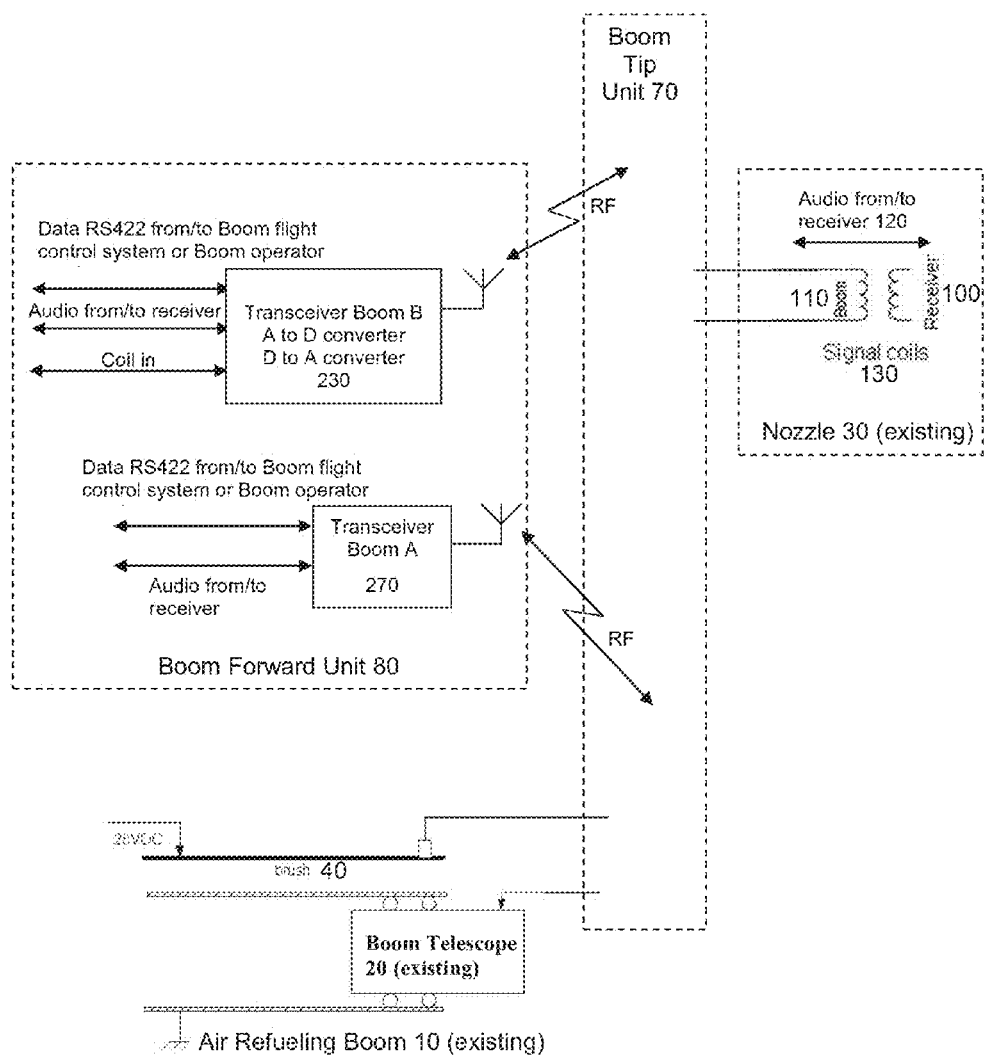
FIG. 2 is a simplified block diagram of components within the Wireless Communication and Sensor system of FIG. 1, in accordance with certain embodiments of the present invention.

Example block diagrams for the Boom Tip Unit 70 and Boom Forward Unit 80 of FIG. 1 are provided in FIG. 2.

Some or all of the following data and data types may be provided:

1. Locking indication: a pulse signal e.g. (say) a 28 VDC pulse signal with longitude of e.g. 5~15 msec (as per MIL-DTL-38449) is provided, e.g. is induced by the refueled aircraft's coil 100 (e.g. 28 V in the coil being refueled) in coil 110. The signal may travel by wireless transmission from the forward unit 80 to the Aft unit 70, then via wired transmission via e.g. RS422 towards the tanker 5.
2. A disconnect command from the tanker 5 is received at the Forward Unit e.g. via RS422 or any suitable wired connection, followed by wireless transmission from the Forward unit 80 to the Aft unit 70 which provides an, input of a 28 V pulse to the refueling coil 110 which then induces a corresponding signal in the refueled aircraft's coil 100.
3. Audio transmission generated at tanker 5 and travelling e.g. via a bidirectional analog interface to the Forward Unit 80, then wireless transmission from the WCSS Forward unit 80 to the Aft unit 70, and then via an analog interface from the Aft Unit 70 to the coil 110 which then induces a corresponding signal in the refueled aircraft's coil 100.
4. Load values are measured by the Aft unit in the boom tip unit 70, and may travel by wireless transmission between the WCSS Aft unit 70 to the Forward unit, then by wired transmission via e.g. RS422 to the tanker 5.

The wired transmission between WCSS Forward Unit 80 and the tanker 5 may be implemented via any suitable digital data bus such as but not limited to RS422, RS232, RS485, MIL-1553, Arinc429, AFDX, CAN or via an analog connection. Some data may be also transmitted via discrete lines.

Data types 1 and 3 above, i.e. lock detection and audio transmission, if implemented in WCSS, may be based on signal processing of the coil 110 signal. This signal processing may be performed digitally by the WCSS Aft Unit 70, e.g. as per MIL-DTL-38449, effectively replacing the analog Boom Signal Amplifier (BSA) which is conventionally installed in boom systems. In this case the processed digital data is transmitted to the tanker systems directly.

Alternatively, the coil 110's raw signal may be merely sampled by the Aft Unit without processing, then transmitted to Forward Unit 80 digitally and converted to an analog signal which is then fed to the conventional Boom Signal Amplifier (BSA). The Boom Signal Amplifier then outputs its contact status and audio signal to relevant tanker systems.

Example application-dependent energy, range, transmission, conversion resolution, and redundancy parameters may be as follows:

The system's energy source may rely on the electrical system of the refueling aircraft 110. The power supply 280 may be connected to the aircraft's electrical system through the brush 40 which is provided in conventional air refueling booms. The return line may be preferably connected to the aircraft return via an additional brush, or via a telescope and boom structure e.g. as shown in FIG. 2. The power supply unit 280 may include special filters to overcome intermittent spikes and interrupts present on the Aft Unit power supply line due to brush sliding contact.

The effective range of wireless communications may be at least 10 meters, which exceeds the actual distance between the Boom Tip Unit 70 and Boom Forward Unit 80 of FIG. 1.

To transmit data from the WCSS (Wireless Communication and Sensor system), a data package may be sent every 10 msec; the packet's size may be up to 200 bit (based on a transmission rate of 12.8 kbps).

For audio, the transmission rate may be 8 kbps continuous.

The system may support a transmission rate of at least 60 kbps.

Conversion Resolution:

The WCSS's (Wireless Communication and Sensor system) values may be sampled by a 12 bit ADC transformer.

Redundancy: The WCSS (Wireless Communication and Sensor system) may, as shown in FIG. 2, comprise two independent channels A and B (double redundancy). The two channels may be identical, except for the interface to the coil, which may be handled by channel B only. The channels may transmit at different frequency ranges. Alternatively, the redundancy of the WCSS and/or the signal coil interface may be single, or triple, quadruple or any other multiple redundancy. In the case of a multiply redundant signal coil interface, the signal coil may be driven by one WCSS channel at a time, while the other channels are in standby. The signal coil (or redundant coils) may be sampled by more than one WCSS channel simultaneously or by one channel at a time, or always by one dedicated channel.

Each WCSS channel may include its own set of load sensing elements e.g. strain gauge/s. The load sensing element may receive excitation voltage from its corresponding channel power supply unit. The load sensing element may be sampled by its corresponding channel and, optionally, by other channels as well.

Figure 5:
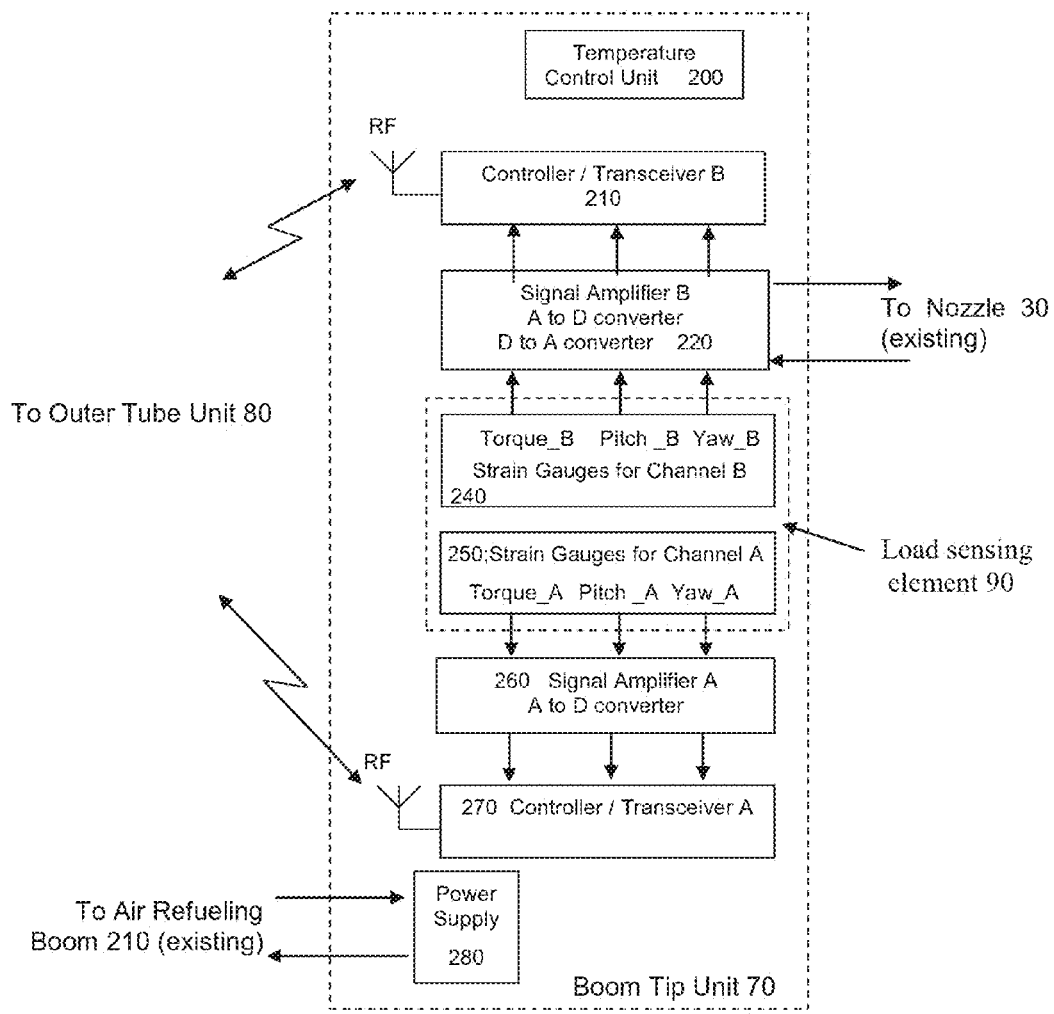
FIG. 5 is a simplified block diagram illustration of electronics which transmit signals to the boom and is typically located, together with load sensing element 90, at boom tip unit 70.

To manage and execute all operations, the system may comprise some or all of the following interface/s:
  i. Data interface between the Transceiver of each channel of Boom Fwd Unit 80 and the flight control system (210, 270 of FIG. 5, e.g.)—RS422 serial link interface or any other digital bus and/or discrete and/or analog interface;
  ii. Audio interface between the Transceiver of one or more channels of Boom Fwd Unit 80 and the tanker audio system—analog or digital inputs/outputs; and
  iii. Signal interface between the signal amplifier (e.g. 220, 260 of FIG. 5) of one or more channels of Boom Aft Unit 70 and the signal coil—analog interface In addition to transmitting data from the WCSS (Wireless Communication and Sensor system) of FIGS. 2-3, the system may provide discrete indications of several events, e.g. some or all of:

i. Power-up command—without On/Off button.
ii. Boom connection On/Off.
iii. System Go/No Go—this indication refers to the system Built In Test e.g. establishment of wireless communication between the two units.

Self-Diagnosis (Built in Test): The Ability to Self-Diagnose and Make Identifications May be Incorporated into the System to Conduct Tests and Basic Maintenance (e.g. BIT Based).

The results of the test may be reported e.g. via a serial bus and a dedicated discrete pin. The report from the serial interface may be in a format that enables to isolate a fault based on the test that failed. The report over the discrete pin may be "Normal" (or "pass" or "correct") if all tests are correct and "Abnormal" (or "fail" or "incorrect") otherwise and/or detailed component health status.

Verification of the communication between the Boom Tip Unit 70 and Boom Forward Unit 80 (ping based) may be provided.

Electrical tests of the strain gauges 240 may be provided e.g. using a parallel calibration resistor for each strain gauge (40 kΩ or similar). Upon conducting the test, an electronic switch connects the resistor to the strain gauges such that there is a signal of known amplitude. For as long as the signal repeats itself, the strain gauges may be considered functional. The system performs the test and sends its results to the operator unit for comparison and verification.

A test for Signal coil 130 may be provided. A connection (temporary and initiated) in the resistor's series may be equal to the resistance of the coil and transfer 28 V through it. The measurement of the drop in voltage in the resistor may be 0 in case of a coil disconnection, 28 V in case of a short circuit, and 14 V if normal.

A Connection signal identification test may be provided through the transmission of an initiated pulse via the coil and verification that the pulse is identified by the processor as a connection.

Verification of the integrity of the digital circuit may be provided.

Verification of the integrity of the power supply 280 may be provided, e.g. by comparing voltages stabilized to their nominal value.

Figure 7:
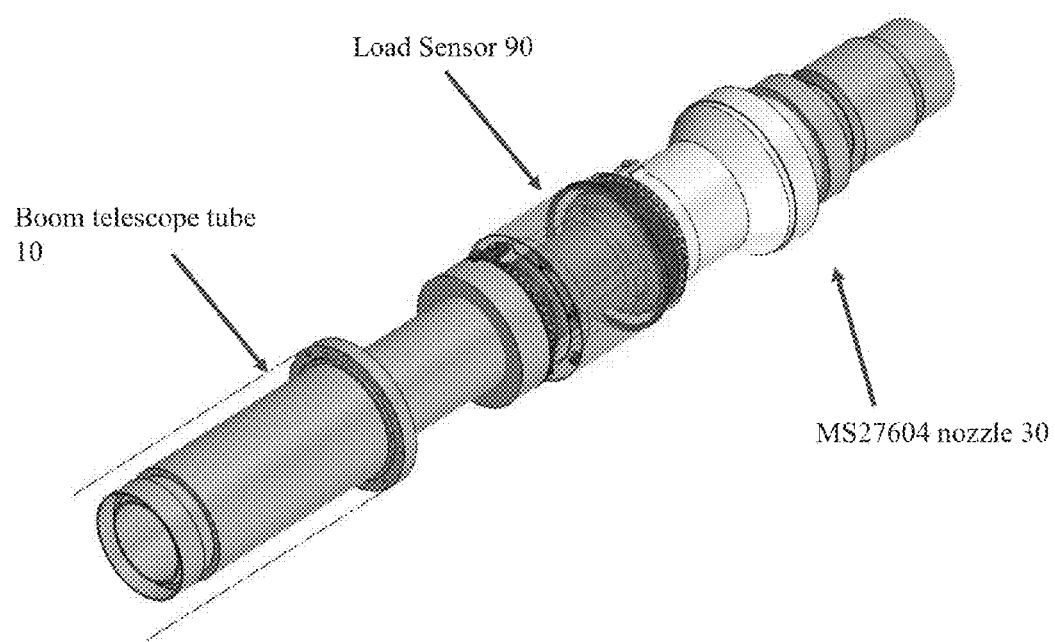
FIG. 7 is a simplified isometric view of an example implementation of a refueling boom tip having nozzle load sensing and wireless communication, in accordance with certain embodiments of the present invention.

FIG. 6 is a simplified flowchart illustration of a wireless communication-based method for refueling, in accordance with certain embodiments of the present invention. The method of FIG. 4 typically includes some or all of the following steps, suitably ordered e.g. as shown:

Step 300: provide legacy nozzle e.g. Military Standard MS27604 Nozzle which may not have nozzle load sensing and/or sensed nozzle load communication capabilities Step 310: provide Wireless Communication and Sensor System (WSCC) serving a refueled entity (receiver) and a refueling entity (tanker) e.g. aircraft, the system comprising nozzle load sensing functionality for a nozzle Boom Tip Unit serving the legacy nozzle; and apparatus for wirelessly transmitting loads sensed by nozzle load sensing functionality to the boom operator/boom flight control computer Step 320: install WSCC in form of plug retrofit between legacy Boom Telescope and nozzle Step 330: refuel, including sensing loads using Load Sensor Units e.g. shear sensitive unit employing strain gauges to generate coil signal representative of nozzle's shear strain Step 340: wirelessly (e.g. using ZigBee or Bluetooth wireless technology) transmit the loads and, optionally, voice communication between receiver and tanker, and, optionally, boom contact status and disconnect command, between the Boom tip unit and boom operator/boom flight control system e.g. via Boom Forward Unit; optionally, some or all of Boom tip loads, voice and a "contact made" signal all travel through a single wireless channel Example Implementation:

An example implementation of a Refueling Boom Tip Having Nozzle Load Sensing and Wireless Communication Functionality is illustrated isometrically in FIG. 7 and is now described. Typically, the sensor hardly elongates the boom. It is appreciated that each of the attributes and parameters appearing below are merely exemplary such that any attribute or parameter below may be provided in the absence of any other attribute or parameter.

The Load Sensor is able to operate continuously for a conventional mission length, while actual transmission of loads is typically only for short times, say of no more than a few minutes (say, approximately 5, 10 or 15 minutes) when the Air Refueling Boom is connected to a receiver Aircraft. A suitable transmission rate from the Load Sensor from the load cell is employed, such as but not limited to 10 Kbps every 10 msec. A suitable transmission rate is employed for voice, such as 8 Kbps continuous.

The Boom Loads Sensor of FIG. 7 is operative to measure nozzle side loads during Air Refueling. Typically, the Sensor measures load components in two orthogonal directions. The measured loads are used by the flight control system for control of the Ruddervator (60 in FIG. 1) to nullify the side loads on the nozzle. Strain-gauges may be provided, e.g. on the neutral (symmetric) plane of the sensor element, e.g. to measure the shear stresses which are typically proportional only to the shear (side) loads. Optionally, shear stresses are magnified by producing thin bottomed pockets. The Load Sensor may be installed as a plug between the nozzle and the telescopic end as shown in FIG. 7, and fuel is free to flow inside a sealed internal tube, which may be of the same or similar diameter as of the boom.

Amplifiers and a wireless communication RX/TX module are provided and are typically installed on the sensor unit. BlueTooth may, for example, be used as a wireless protocol, since its effective range is no more than 10 meters.

The Load Sensor Unit (LSU) may serve some or all of the following functions:
a. Measure side loads with strain gauges
b. Drive the signal coil with "disconnect" command and voice transmission to receiver a/c
c. Monitor the signal coil for "connected" status and voice transmission from receiver a/c
d. Transmit and receive above signals to/from Boom Flight Control Computers (BFCC) and Remote Air Refueling Operator Station (RARO)

The Load Sensor Unit (LSU) may be single-redundant mechanically and dual-redundant electronically. Electrical redundancy may be achieved by providing two independent channels A and B. Each channel may include some or all of:
a) 1 full strain gauge bridge (4 SGs) on pitch axis
b) 1 full strain gauge bridge (4 SGs) on yaw axis
c) Analog amplifier
d) Power supply unit
e) Load Sensor Unit-mounted RF transceiver including antenna
f) Boom mounted RF transceiver including antenna The analog amplifier may have the following interfaces and functions:
a) Loads measurements: may supply voltage to strain gauge bridge SG and amplify the low voltage output. It may also provide all signal conditioning required for strain gauge bridge SG.

b) Signal coil

The amplifier may receive analog signal from transceiver including "disconnect" command pulse and voice transmission to receiver. This signal may be amplified to drive the signal coil. The signal coil is typically located on the nozzle tip and electro-magnetically interacts with a receiver signal coil when the boom is connected to the receiver. The signal coil drive function may be implemented in channel A only.

The transceivers may be of BlueTooth (BT) type for both channels. The radio frequency may be different for each channel to minimize complete link loss probability.

The Load Sensor Unit (LSU) transceiver may perform some or all of the following:

1. Sample the SG amplified output for 2 axes, convert e.g. via 12 bit ADC and transmit to Boom transceiver.
2. Sample the signal coil voltage and process the input to derive "connected" status and voice transmission from receiver a/c, then transmit to Boom transceiver
3. Receive "disconnect" command and voice transmission from Boom transceiver to receiver a/c. This data may be processed and converted e.g. via 12 bit DAC to single analog signal which will be amplified by amplifier and drive the signal coil.
4. Perform Built In Test and transmit the results.

The Boom transceiver may perform some or all of the following:

1. Receive the "disconnect command" e.g. from Boom Flight Control Computers
(BFCC) via digital cable bus (RS422) and transmit to Load Sensor Unit (LSU).
2. Receive analog audio (voice) from Remote Air Refueling Operator Station (RARO), process and transmit to Load Sensor Unit (LSU).
3. Receive load measurements and "connected status" from Load Sensor Unit (LSU) and transmit to Boom Flight Control Computers (BFCC) e.g. via digital cable bus (RS422).
4. Receive voice from Load Sensor Unit (LSU), process, and convert to analog audio to be routed to Remote Air Refueling Operator Station (RARO). Optionally the audio may be transmitted to Remote Air Refueling Operator Station (RARO) digitally and processed there.
5. Perform Built In Test and transmit the results to Boom Flight Control Computers (BFCC).

The wired messages between Boom Flight Control Computers (BFCC) and Boom transceiver may be sent periodically e.g. each 10 msec. The protocol typically includes a checksum. The wireless data (excluding voice) between transceivers may be sent multiple times during the 10 ms (say) period to minimize data corruption probability. The wireless protocol may include additional features to prevent data corruption.

The minimum baud rate for loads and status data is, say, 10 kbps. The audio may be sampled and compressed for reasonable voice (speech) quality. The minimum baud rate for voice data may be, say, 8 kbps.

It is appreciated that terminology such as "mandatory", "required", "need" and "must" refer to implementation choices made within the context of a particular implementation or application described here within for clarity and are not intended to be limiting since in an alternative implantation, the same elements might be defined as not mandatory and not required or might even be eliminated altogether.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally includes at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention which are described in the context of separate embodiments may also be provided in combination in a single embodiment.

For example, a system embodiment is intended to include a corresponding process embodiment.

Conversely, features of the invention, including method steps, which are described for brevity in the context of a single embodiment or in a certain order may be provided separately or in any suitable subcombination or in a different order. "e.g." is used herein in the sense of a specific example which is not intended to be limiting. Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, PDA, Blackberry GPRS, Satellite including GPS, or other mobile delivery. It is appreciated that in the description and drawings shown and described herein, functionalities described or illustrated as systems and sub-units thereof can also be provided as methods and steps therewithin, and functionalities described or illustrated as methods and steps therewithin can also be provided as systems and sub-units thereof. The scale used to illustrate various elements in the drawings is merely exemplary and/or appropriate for clarity of presentation and is not intended to be limiting.

The invention claimed is:

1. A wireless communication and sensor system serving a refueled entity and a refueling entity, the system comprising:
    a nozzle boom tip unit;
    nozzle load sensor disposed on the nozzle boom tip unit to sense loads on the nozzle boom tip unit, wherein the load sensor senses at least one of shear, bending and torque stresses exerted on the load sensor to estimate forces exerted on the nozzle boom tip unit; and
    apparatus for wirelessly transmitting loads sensed by said nozzle load sensor to at least one of a boom operator and a boom flight control computer, wherein data, received from load sensor units which are located on a boom telescope having telescopic motion relative to a surrounding external tube, is transmitted to a point located on the external tube.

2. A system according to claim 1, wherein the system includes:
    a boom forward unit disposed about the boom tip unit, and wherein said loads are transmitted wirelessly from the boom tip unit to at least one of a boom operator and a boom flight control computer via the boom forward unit.

3. A system according to claim 2, wherein the boom forward unit is disposed at a location unaffected by telescopic motion of the boom telescope having telescopic motion relative to the surrounding external tube during refueling.

4. A system according to claim 2, wherein the boom tip unit is operative to digitally process boom contact signals, lock detection signals, and audio transmission signals, and generating processed digital data for direct transmission to tanker systems of at least one of the refueled entity and refueling entity.

5. A system according to claim 4, wherein the boom tip unit is operative to perform digital signal processing to generate at least one of lock detection and audio transmission data based on a refueling coil's signal and transmits the at least one of lock detection and audio transmission data to at least one tanker system directly.

6. A system according to claim 2 wherein the boom tip unit is operative to digitally obtain signal samples of boom contact signals, lock detection signals, and audio transmission signals, transmit the digital signal samples to said boom forward unit, and wherein said boom forward unit converts the digital signal samples to an analog signal for processing by analog boom signal amplifiers that feed the signals to tanker systems of at least one of the refueled and refueling entities.

7. A system according to claim 6, wherein the boom tip unit is operative to:
sample a refueling coil's raw signal, and
digitally transmit the sampled raw signal to the boom forward unit,
wherein the boom forward unit is operative to convert the transmitted signal to said analog signal, and feed said analog signal to said boom signal amplifiers which output to at least one tanker system at least one of: contact status and an audio signal.

8. A system according to claim 2, wherein the load sensor is configured to measure side loads with strain gauges, drive a signal coil, monitor the signal coil, and transmit and receive signals to and from the boom flight control computer.

9. A system according to claim 1, which provides wireless voice communication between the refueled entity and the refueling entity.

10. A system according to claim 9, wherein said voice communication between the refueled entity and the refueling entity passes through the boom tip unit.

11. A system according to claim 1, wherein said refueled entity and refueling entity comprise aircraft.

12. A system according to claim 11, wherein any two of the following:
boom tip loads, voice, "contact made" signal, and "disconnect" command, all travel through a single wireless channel.

13. A system according to claim 1, wherein the load sensor is configured to communicate a sensed load to an air refueling boom system.

14. A system according to claim 1, wherein said load sensor comprises a mechanical loads sensor which is operative to generate a signal representative of loads exerted on the nozzle, and to transmit the loads signals and a coil signal including voice communication between the refueled entity and the refueling entity and a "contact made" signal provided from the nozzle and a "disconnect" command signal directed to the nozzle.

15. A system according to claim 14, wherein the load sensor comprises strain gauges operative to measure the at least one of shear and torque stresses exerted on the nozzle.

16. A system according to claim 14, wherein the load sensor comprises strain gauges operative to measure the at least one of bending and torque stresses exerted on the nozzle.

17. A system according to claim 1, wherein said signals are transmitted wirelessly using Bluetooth wireless technology.

18. A system according to claim 1, wherein said signals are transmitted wirelessly using ZigBee wireless technology.

19. A system according to claim 1, wherein said signals are transmitted wirelessly using Free Space Optical wireless technology.

20. A system according to claim 1, wherein a range of telescopic boom motion of the boom telescope having telescopic motion relative to the surrounding external tube occurs during refueling of an aircraft and wherein transmission power is configured to a minimum required given the range of said telescopic motion, so as to reduce the aircraft electromagnetic signature and provide for operation in radio silence.

21. A system according to claim 1, wherein the apparatus for wirelessly transmitting loads is operative to dynamically change transmission frequency of the wireless transmission.

22. A system according to claim 1, comprising a plurality of redundant channels, each of said plurality of redundant channels having independent load sensors.

23. A method for providing a legacy air refueling boom with a nozzle load sensing capability, the method comprising:
providing a nozzle boom tip unit, serving a nozzle which does not have nozzle load sensing and sensed nozzle load communication capabilities, with a nozzle load sensor to sense loads on the nozzle boom tip unit, wherein the load sensor senses at least one of shear, bending and torque stresses exerted on the load sensor to estimate forces exerted on the nozzle boom tip unit; and
providing an apparatus for wirelessly transmitting loads sensed by said nozzle load sensor to a boom forward unit and then to at least one of a boom operator and a boom flight control computer, wherein data, received from load sensor units which are located on a telescope having telescopic motion relative to a surrounding external tube, is transmitted to a point located on the external tube.

24. A method according to claim 23, wherein said nozzle comprises a Military Standard MS27604 Nozzle.

25. A method according to claim 23, further comprising using said nozzle boom tip unit for wireless transmission of sensed nozzle loads.

26. A method according to claim 23, further comprising using said nozzle boom tip unit for establishing wireless voice communication between a receiver and a tanker.

27. A method according to claim 23, further comprising using said nozzle boom tip unit for wirelessly transmitting at least one of a "contact made" signal created at the nozzle and a "disconnect" command signal directed to the nozzle.

28. A method according to claim 23, wherein said boom tip unit comprises a plug to be installed between a legacy boom telescope and a nozzle of the nozzle boom tip unit, thus enabling retroactive installation of the nozzle boom tip unit in an air refueling boom equipped with said nozzle.

29. A method according to claim 28, wherein said nozzle comprises a MS27604 nozzle.

30. A method according to claim 23, further comprising:
passing, via a bidirectional interface, audio transmissions generated at a tanker to the boom forward unit,
then transmitting the audio transmissions wirelessly from the forward unit to an aft unit in the boom tip unit, and
then transmitting the audio transmissions, via an analog interface, from the aft unit to a refueling coil which then induces a corresponding signal in a refueled aircraft's coil.

31. A method according to claim 30, further comprising:
measuring load values by the aft unit in the boom tip unit, transmitting the load values wirelessly between the aft unit to the forward unit, and then transmitting, via wired transmission, from the forward unit to the tanker.

32. A method according to claim 23, wherein the provided load sensor is characterized by electrical redundancy achieved by providing plural independent channels each including an analog amplifier operative to
   a) receive at least one analog signal from a transceiver including at least one of a "disconnect" command pulse and voice transmission to a receiver and wherein said analog signal in at least one of said channels is amplified to drive a signal coil located on the nozzle tip and electro-magnetically interacting with a receiver signal coil when the boom tip unit is connected to the receiver, and
   b) to receive at least one signal from among:
      a load signal from said load sensing functionality; and
      a "contact made" signal from a signal coil, and
   c) to output said at least one signal to a transceiver.

33. A computer program product, comprising a non-transitory tangible computer readable medium having computer readable program code embodied therein, said computer readable program code adapted to be executed to implement a method for providing an air refueling boom with a nozzle load sensing capability, the method comprising:

providing a nozzle boom tip unit which is serving a nozzle which lacks nozzle load sensing and sensed nozzle load communication capabilities, with a nozzle load sensor to sense loads on the nozzle boom tip unit, wherein the load sensor senses at least one of shear, bending and torque stresses exerted on the load sensor to estimate forces exerted on the nozzle boom tip unit; and wirelessly transmitting loads sensed by said nozzle load sensor to a boom forward unit and then to at least one of a boom operator and a boom flight control computer, wherein data, received from load sensor units which are located on a telescope having telescopic motion relative to a surrounding external tube, is transmitted to a point located on the external tube.

* * * * *